United States Patent [19]

Leppert

[11] 4,147,115
[45] Apr. 3, 1979

[54] INCINERATOR WITH GAS GENERATION

[76] Inventor: Alfred M. Leppert, 906 Bibb Ave., Auburn, Ala. 36830

[21] Appl. No.: 833,167

[22] Filed: Sep. 14, 1977

[51] Int. Cl.² .............................................. F23G 5/12
[52] U.S. Cl. .................................. 110/244; 110/261; 110/346
[58] Field of Search .............. 110/243, 244, 346, 261, 110/263

[56] References Cited

U.S. PATENT DOCUMENTS

| 3,500,775 | 3/1970 | Hubbard | 110/244 |
|---|---|---|---|
| 3,580,194 | 5/1971 | Withers | 110/244 |
| 3,654,881 | 4/1972 | Bowles | 110/244 |
| 3,817,192 | 6/1974 | Watterback | 110/244 |
| 3,837,813 | 9/1974 | Ebeling et al. | 110/244 |
| 3,861,330 | 1/1975 | Santoleri | 110/244 |

*Primary Examiner*—Henry C. Yuen
*Attorney, Agent, or Firm*—William E. Mouzavires

[57] ABSTRACT

An incinerator for burning combustible materials, especially waste materials, and for generating hot gases for use in processes outside the incinerator, includes a cylindrical combustion chamber having closed end walls and a generally tangential opening in the side wall extending along a major portion of the chamber length for admitting combustible materials and air in a sheet-like stream around the chamber wall. A tapered, or frusto-conical gas collector tube mounted coaxially within the combustion chamber extends through one end wall and terminates in an open end spaced from the combustion chamber. The collector tube has a plurality of openings to permit combustion gases to enter and flow out of the combustion chamber through the open end. A substantially cylindrical jacket surrounding the combustion chamber has an air inlet at one end and a venturi-like outlet section at the other end, with the throat of the venturi surrounding the collector tube open end so that cooling air flowing through the jacket over the external surface of the combustion chamber mixes with the combustion gases.

16 Claims, 5 Drawing Figures

INCINERATOR WITH GAS GENERATION

BACKGROUND OF THE INVENTION

1. Field of the Invention

This invention relates to hot gas generating apparatus, and more particularly to an incinerator apparatus for burning combustible materials for the generation of hot gases for use outside the apparatus. The invention specifically relates to an improved incinerator for the complete and clean burning of waste combustibles and combining the hot combustion gases with incinerator cooling air to provide a hot gas mixture suitable for use in heating and drying processes and the like.

2. Description of the Prior Art

The term "incinerator" has generally been employed to designate a device for burning waste products as a means of waste disposal. In the prior art incinerators, the hot gases produced during combustion generally have been discharged into the atmosphere, with little or no attempt being made to utilize the energy released by the combustion process. These devices are distinguished from furnaces in which fuel is burned for the generation of hot combustion gases which are then used to heat a second medium, through a heat exchanger or heat exchange surface, with the thermal energy normally being transferred by the second medium for use in processes outside the furnace. Thermal losses in such furnaces are, of course, always encountered in the transfer of heat between the combustion gases and the second medium.

Combustion air pre-heaters and the like are frequently employed with both furnaces and incinerators to try to salvage, or scavenge, waste heat, but such devices are relatively expensive both to purchase and to operate, and are only effective to a limited degree.

The increased emphasis on reduction of air pollution has resulted in greater emphasis being placed upon the assurance of complete or clean combustion in incinerator devices such as those used at municipal incinerator plants, industrial processes, and the like. Accordingly, a number of new incinerator devices have recently been developed, one such device being illustrated, for example, in U.S. Pat. No. 3,771,469. This device employs a horizontally-disposed cylindrical combustion chamber with an exhaust outlet in one end wall leading to a stack which discharges into the atmosphere. Burnable waste material and combustion air is discharged into the refractory-lined combustion chamber through a tangential opening adjacent the other end wall, with combustion taking place as the material moves in a swirling or vortical pattern around and through the chamber into the exhaust outlet. Additional fuel may be supplied through a nozzle arrangement including means for supplying additional combustion air for the fuel to assure burning of wet or hard-to-burn combustible materials. Vortical movement within the combustion chamber carries unburned particulate solids from the combustion chamber through the exhaust outlet.

In the operation of conventional furnaces, air in the combustion chamber in excess of that required for stoichiometric combustion of the fuel generally must be held to a minimum since such excess air absorbs thermal energy which could otherwise be transferred to the working fluid. This absorbed energy is lost as the excess air and combustion gas pass out of the system as exhaust. Combustion air supplied in quantities less than that required for stoichiometric combustion causes incomplete burning of the fuel with the result that excess quantities of unburned fuel and carbon monoxide are present in the stack gas. Further, the production of carbon monoxide instead of carbon dioxide results in the wasting of substantial quantities of the available energy in hydrocarbon fuels. Some excess air is therefore normally provided in order to promote total combustion and to control the temperature of combustion to avoid the production of nitrogen oxide pollutants which are formed only at very high temperatures. However, careful control of the excess air must be maintained in order to balance the opposing factors in the conventional furnace design.

SUMMARY OF THE INVENTION

The present invention is primarily concerned with a combustion apparatus for the burning of relatively uniform waste material of the type frequently produced in industrial processes, and for recovering the heat energy thus liberated for use in process heating. Numerous processes regularly produce combustible waste which must be disposed of but which, nevertheless, may be burned to release substantial amounts of heat energy. For example, in the lumber industry, the conversion of logs to finished lumber results in up to one-half the wood being left at the sawmill in the form of waste. The waste wood could be employed to supply the heat required to kiln-dry the lumber.

The agricultural industry also normally produces substantial quantities of waste material which could be burned for the production of heat regularly used in drying, curing, and the like. For example, in the processing of freshly-harvested peanuts, the nuts are first dried by the use of hot air. The dried hulls are then removed and become a waste product which could be burned to produce the heat required in the drying process. Numerous other examples can be cited wherein a waste product is produced in a process in which the waste product could be burned for the production of heat required elsewhere in the process, and it is the primary purpose of the present invention to produce a combustion apparatus particularly suited for use in such processes.

The combustion apparatus, or incinerator, of the present invention includes a cylindrical combustion chamber having closed end walls and a generally tangential opening in the side wall extending along a major portion of the chamber length for admitting combustible waste material and combustion air, in a sheet-like stream, directed around the chamber wall. A tapered, or frusto-conical gas collector tube is mounted coaxially within and extends substantially the full length of the combustion chamber. The large end of the collector tube extends through one end wall and terminates in an open outlet end spaced from the combustion chamber. A plurality of openings are formed in the wall of the collector tube around its periphery and along the full length within the combustion chamber to permit gases to enter the collector and pass out of the combustion chamber.

As the combustible material and air enter the combustion chamber in a tangential direction, they flow in an inward spiral pattern to the collector tube. Combustion takes place during this spiral flow pattern, reaching a maximum temperature near the center of the combustion chamber at the collector tube. The walls of the collector tube thus are very hot during operation, with the hot surface acting as an ignitor to contact and ignite any small combustible particles entrained in the gas to assure completion of the burning process and thereby substantially eliminate particulate combustibles from the exhaust gas. An ignition burner is provided at the entrance nozzle to initiate operation of the apparatus.

A cylindrical jacket surrounds the combustion chamber in outwardly spaced relation, defining a plenum chamber around the outer wall of the combustion chamber. A transition section is provided on the jacket at the end of the collection chamber opposite the outlet of the collection tube, with this transition section acting as an air inlet to admit and distribute cooling air over the outer surface of the combustion chamber. The opposite end of the cylindrical jacket has a transition section in the form of a venturi, with the throat of the venturi surrounding the outlet of the collector tube so that cooling air flowing over the outer surface of the combustion chamber will mix with and cool the exhaust gases. The temperature of the gas mixture can thus be controlled by controlling the amount of cooling, or tempering air. The cooled, or tempered gas mixture can thus be conveyed, through a suitable duct system, from the apparatus for use in heating or drying processes.

BRIEF DESCRIPTION OF THE DRAWINGS

The foregoing and other features of the invention will be apparent from the detailed description contained hereinbelow, taken in conjunction with the drawings, in which.

DESCRIPTION OF THE PREFERRED EMBODIMENTS

Figure 1:
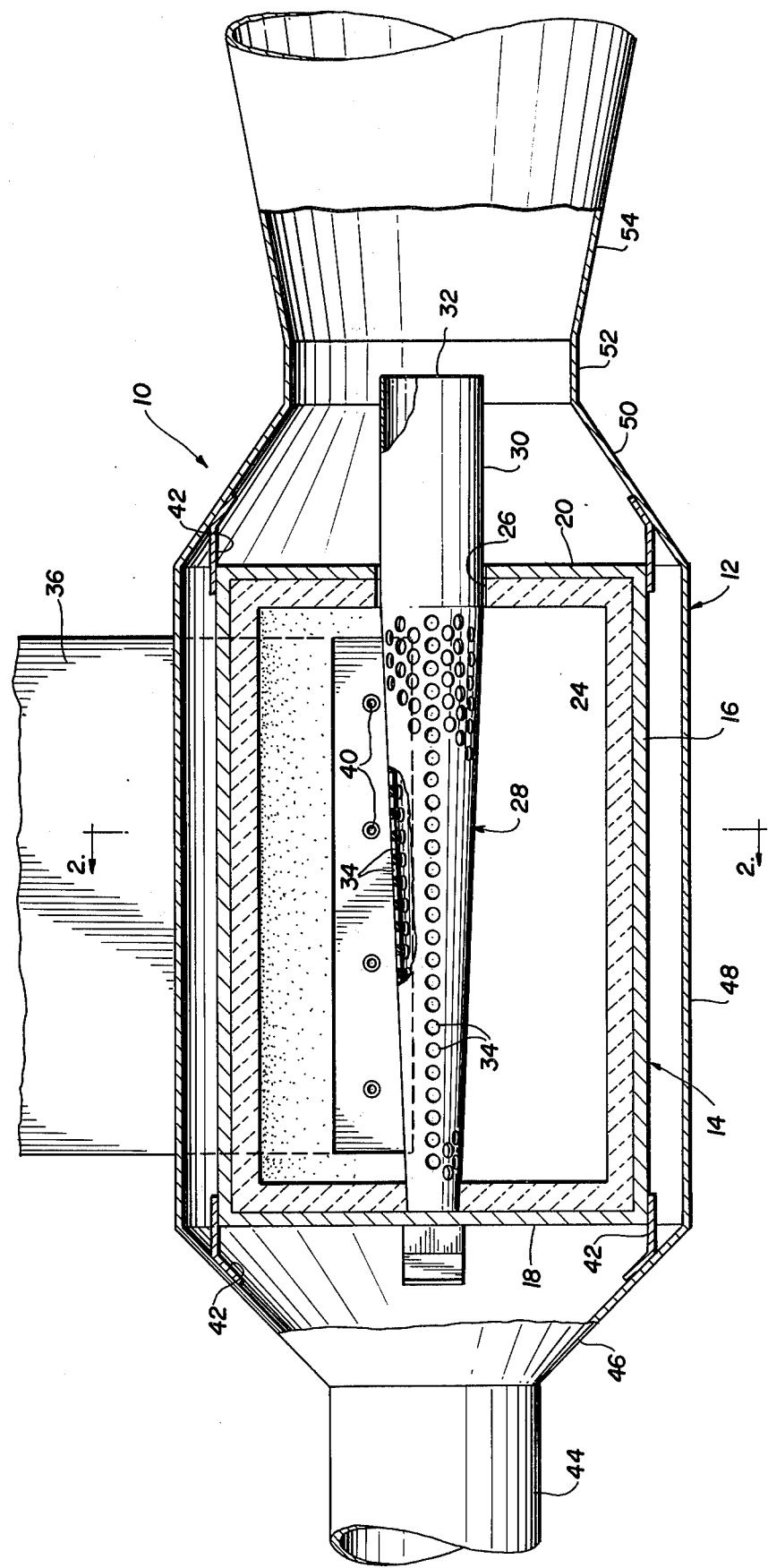
FIG. 1 is an elevation view, in section, of an incinerator according to the present invention.
Figure 2:
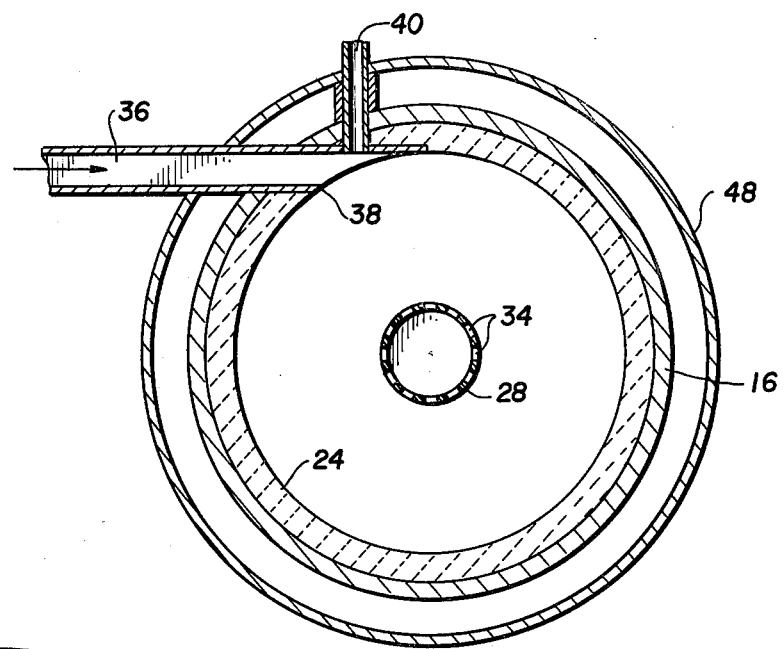
FIG. 2 is a sectional view, taken on line 2—2 of FIG. 1.

Referring now to the drawings in detail, an incinerator apparatus according to the invention is indicated generally at 10 in FIG. 1, and includes an outer jacket or housing 12 and an inner cylindrical burner assembly 14 supported within the outer housing. The burner assembly 14 has an outer shell preferably formed from metal plate, with the shell having a cylindrical body portion 16 and spaced, generally parallel end walls 18, 20 which cooperate to define an elongated cylindrical combustion chamber 22. The inner surface of the cylindrical body and end wall portions of the burner shell are lined with a continuous layer of heat-resistant refractory material 24.

A circular opening 26 is formed in and extends through the end wall 20, and through the layer of refractory material extending over this end wall, with opening 26 having its center on the longitudinal axis of the cylindrical burner assembly 14. A frusto-conical gas collector tube 28 is mounted coaxially within the combustion chamber 22 and has its larger end portion extending through and supported within the opening 26. The collector tube 28 preferably extends completely through the combustion chamber 22 and has its small end closed and supported by the end wall 18 and the refractory lining 24. The collector tube 28 has a generally cylindrical extension 30 on its large end, with the extension 30 projecting outwardly from end wall 20 and terminating in an open outlet 32. Collector tube 28 and extension 30 are preferably formed from a high-temperature metal alloy capable of resisting the elevated temperatures near the center of the combustion chamber. A plurality of openings 34 are formed in the wall of the collector tube throughout its length and around its periphery within the combustion chamber to permit combustion gases to enter from the center of the combustion chamber and escape axially through the open end 32. The openings 34 preferably are arranged to provide a substantially uniform open area per unit length along the collector tube to provide for uniform flow of gases into the tube from the combustion chamber.

Combustible materials such as sawdust, shredded straw, stalks, nutshells, or other like waste material, is blown into the burner assembly 14 through an inlet conduit or duct 36, with the air used to convey the burnable material also serving as the combustion air to support combustion within the chamber 22. Conduit 36 is a generally rectangular conduit, at least in the area adjacent the incinerator, with the width dimension, i.e., the dimension measured in the direction parallel to the axis of combustion chamber 22, being substantially as great as the internal axial dimension of the combustion chamber. The thickness measurement of the duct 36, i.e., the dimension measured in a direction perpendicular to the longitudinal axis of the combustion chamber, is relatively small, so that the combustion air and waste combustible material is conveyed into the combustion chamber in a thin sheet extending substantially the length of the combustion chamber.

The cylindrical wall 16, and the layer of refractory material covering its internal surface, have an elongated slot-like opening or nozzle 37 formed therein for receiving the terminal end 38 of duct 36. The duct 36 extends through the wall of the combustion chamber in a direction substantially tangential to the inner circumferential surface so that the combustible material and combustion air are discharged in a thin stream around the inner periphery of the combustion chamber substantially along its full length. This results in the material following an inwardly spiraling pattern around the interior of the combustion chamber to the central portion where the combustion gases enter the collector tube for movement axially out of the combustion chamber.

A plurality of fuel nozzles 40 are mounted in the combustion chamber wall, adjacent the outlet 38 of the duct 36 to supply an auxiliary fuel such as oil, gas, or the like, for initially igniting and heating the incinerator. After initial start-up and heating of the incinerator sufficiently to maintain combustion, the auxiliary fuel can be shut off. Temperature within the combustion chamber will then remain high enough to ignite the combustible waste material entering the chamber, with combustion being completed during the inward spiral flow pattern to the collector tube 28. It is apparent that, in order to assure the complete combustion, some waste combustible materials may have to be crushed, shredded, or otherwise reduced whereas others, such as sawdust, may be sufficiently finely divided in order to complete the combustion without further preparation.

The burner assembly 14 is supported within the outer jacket 12, as by a plurality of angled brackets, or legs 42, with the jacket providing a plenum confining a flow of cooling air over the outer surface of the burner assembly to absorb heat from the outer metal shell. Cooling air is supplied from a suitable blower, not shown, through an inlet conduit 44 connected to the inlet end of the jacket 12. The inlet of the jacket is in the form of a first, generally frusto-conical transition section 46 having its small end connected directly to the conduit 44 and its large end connected to one end of a cylindrical body section 48 which extends in outwardly spaced, coaxial relation to the cylindrical wall 16 of the burner assembly. The other end of the body section 48 is connected to a venturi-like conduit system including a converging frusto-conical transition section 50, a short cylindrical throat section 52 which surrounds the outlet end 32 of the collector pipe 28, and an outwardly-diverging, conical section 54 which, in turn, can be connected to a hot gas supply conduit, not shown, for conducting hot gas to a place of utilization as in a heating or drying process.

During operation of the apparatus thus described, hot combustion gases discharged from the collector tube 28 are mixed with the cooling air flowing through the jacket 12 in the throat of the venturi section of the jacket. The supply of cooling air further assures complete combustion of any unburned hydrocarbon materials emitted from the end of the collector tube. At this point, the temperature of the combustion gas is sufficiently high to sustain combustion for at least a brief interval as the additional air is mixed with the combustion gases.

It is readily apparent that the amount of combustion air supplied to the combustion chamber can be varied, as required, to produce the desired combustion conditions within the chamber without concern with the temperature of the gas discharged from the collector tube. The temperature of the combustion and cooling air gas mixture, i.e., the tempered air, can readily be controlled by controlling the volume of cooling air flowing around the outer surface of the combustion chamber. Since the cooling air and combustion air are mixed directly for subsequent use as a heating or drying medium, no heat is lost through the use of heat exchange mediums, or the like.

The location of the collector tube in the center of the combustion chamber, and extending substantially completely therethrough, is an important part of the present invention. The large number of relatively small openings 34 in the collector tube 28 provides for a substantially uniform escape of combustion air from the center of the combustion chamber so that gas flow in the chamber follows an inwardly spiraling pattern in a uniform manner substantially throughout the full length of the combustion chamber.

Since the collector tube 28 is located at the hottest portion of the combustion chamber, the temperature of the metallic surface of the collector tube will act as an ignitor for any unburned particles reaching the center of the combustion chamber. Thus, even if such particles find their way through an opening 34, combustion will be completed as the burning particles move along the collector tube. The extension 30 of the collector tube 28 provides for all combustion gases which enter the collector tube to flow through a confined area to the throat of the venturi section before being discharged into the cooling air. This distance is at least as great as the diameter of the collector tube outlet and preferably about twice this diameter. This provides additional time for the complete combustion of any unburned particles which may enter the collector tube near the end wall 20. The spiraling flow pattern in the combustion chamber tends to throw the heavier unburned particles toward the outside of the chamber to further assure complete combustion.

The incinerator apparatus illustrated in FIG. 1 may be arranged with the axis of the combustion chamber either in a horizontal or vertical position. It is also understood that suitable blower means, not shown, will be required to provide the necessary air flow velocity for conveying and propelling the combustible waste material through the duct 36 and inlet opening 38 into the combustion chamber. The flow of cooling air may be induced by convection currents or forced as by a blower, as required.

Figure 4:
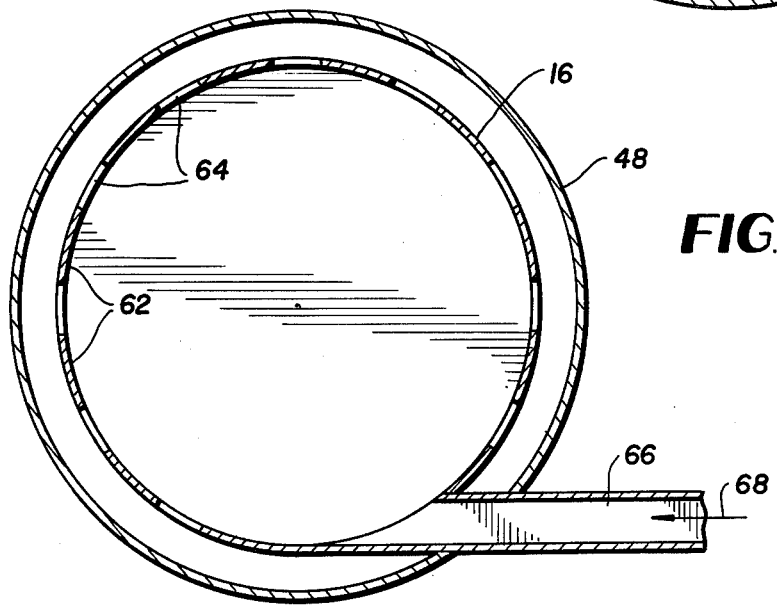
FIG. 4 is a sectional view taken on line 4—4 of FIG. 3.
Figure 3:
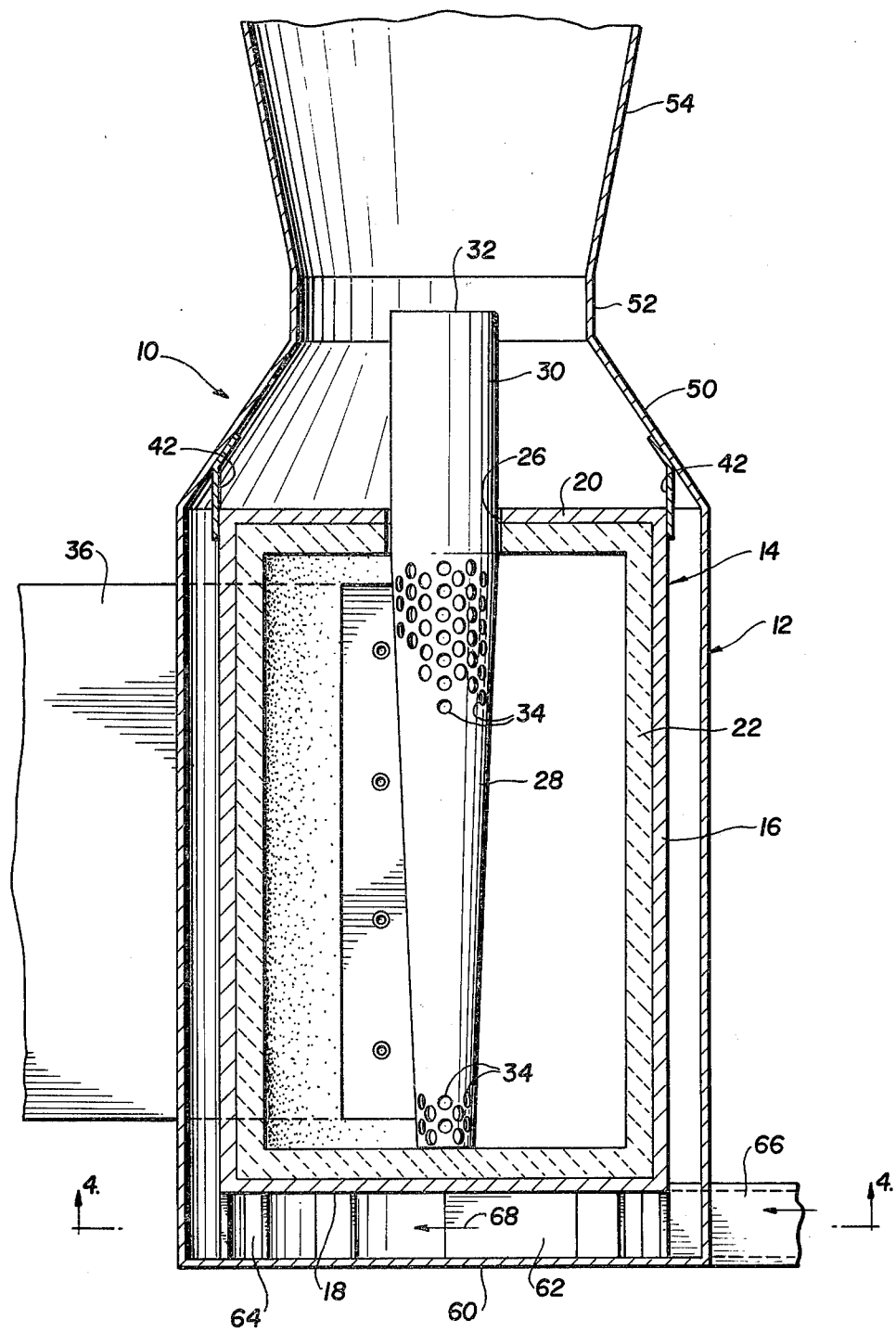
FIG. 3 is a view similar to FIG. 1 and showing an alternate embodiment of the invention.

The embodiment of the invention shown in FIGS. 3 and 4 is substantially identical to that described above, with the exception of the inlet end of the outer jacket. Accordingly, like reference numerals have been applied to corresponding parts of the structure, and only the modifications will be described in detail. This embodiment of the invention is intended primarily for an upright incinerator, i.e., one in which the longitudinal axis of the combustion chamber and collector tube extend in a vertical direction, with the inlet air being supplied beneath the end wall 18 of the combustion chamber.

As shown in FIG. 3, in this upright embodiment of the invention, the cylindrical body portion 48 of the outer jacket 12 is slightly longer than the burner assembly 14, with section 48 projecting below the burner assembly and having its end closed by a base plate 60 which extends in parallel relation to and spaced below the end plate 18. An annular skirt 62 is rigidly mounted onto the bottom end of cylindrical wall 16 of the burner section, with the skirt extending downwardly to engage the base plate 60 to support the burner assembly. A plurality of vertical slots 64 are formed in the skirt 62, at spaced intervals therearound, to permit air, supplied to the interior of the skirt 62 through a bottom supply duct 66, to escape from the skirt and pass upwardly around the outer periphery of the cylindrical burner assembly. Duct 66 extends through a cylindrical wall 48 and has its outlet in direct fluid communication with the space within skirt 62 between base plate 60 and end wall 18, as shown by the arrow 68 in FIG. 3.

Figure 5:
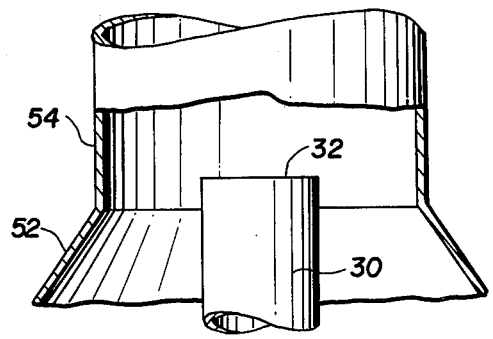
FIG. 5 is a fragmentary sectional view, in elevation, showing a further modification of the invention.

FIG. 5 illustrates a further modification which may be applied to either of the embodiments previously described. This modification involves only the elimination of the diverging conical section 54 of the venturi, and replacing it with a straight conduit section. In most installations, however, it is believed that the venturi arrangement will be desirable in order to produce a more uniform mixing of the cooling air and combustion gases and to avoid possible back pressure within the combustion chamber.

While I have disclosed and described a preferred embodiment of my invention, I wish it understood that I do not intend to be restricted solely thereto, but rather that I intend to include all embodiments thereof which would be apparent to one skilled in the art and which come within the spirit and scope of my invention.

I claim:

1. An incinerator system for supplying hot gas for use outside the incinerator, comprising, in combination,
    a combustion chamber having spaced end walls joined by a substantially cylindrical side wall,
    an elongated narrow slot formed in said side wall defining an inlet nozzle extending longitudinally of the side wall throughout at least a major portion of the length of the combustion chamber, inlet duct means connected to said inlet nozzle for supplying combustion air and combustible waste material into the combustion chamber, said duct and nozzle being shaped to discharge a thin stream of the air and waste material in a direction substantially tangential to the inner surface of the combustion chamber adjacent the inlet nozzle, an elongated gas collector tube mounted coaxially within and extending substantially the full length of the combustion chamber and having one end extending outwardly therefrom through an opening in one of said end walls and terminating in an open outlet, the portion of said collector tube within said combustion chamber having a plurality of openings formed therein and spaced along substantially its full length to permit gases to flow from the combustion chamber into the collector tube substantially uniformly along the length of said combustion chamber, and to be discharged through said outlet, said collector tube is substantially frusto-conical in shape within the combustion chamber with the larger end of the frusto-conical tube extending through said opening in said one wall, auxiliary burner nozzle means for heating the combustion chamber to ignite combustible material entering the combustion chamber through said inlet nozzle, and housing means surrounding the combustion chamber for directing a flow of cooling air over the outer surface of the combustion chamber, said housing means including means surrounding said outlet for combining the cooling air and the combustion gases flowing from the collector tube outlet to provide the supply of hot gas.

2. The invention as defined in claim 1 wherein said collector tube has its other end closed to preclude the entry of combustion gases therethrough.

3. The invention as defined in claim 2 wherein said combustion chamber has an external shell formed from metal plate and an internal lining formed from a heat-resistant refractory material.

4. The invention as defined in claim 3 wherein said collector tube is formed from a high-temperature metal alloy capable of withstanding the high temperatures encountered within the incinerator.

5. The invention as defined in claim 4 wherein said plurality of openings in said collector tube are arranged to provide a substantially constant opening area along substantially the full length of the interior of the combustion chamber.

6. The invention as defined in claim 1 wherein said open outlet on said collector tube is spaced outwardly from said one wall a distance at least equal to the diameter of the collector tube at said outlet.

7. The invention as defined in claim 1 wherein said housing means comprises a conduit system including an outlet in the form of a venturi section, said outlet of said collector tube being located substantially at the throat of said venturi section.

8. The invention as defined in claim 8 wherein said plurality of openings in said collector tube are arranged to provide a constant opening area along the length of the combustion chamber.

9. An incinerator system comprising, in combination, a combustion chamber having spaced end walls joined by a substantially cylindrical side wall, an elongated slot formed in said side wall defining an inlet nozzle extending longitudinally of the side wall throughout at least a major portion of the length of the combustion chamber, inlet duct means connected to said inlet nozzle for supplying combustion air and combustible waste material into the combustion chamber, said duct and nozzle being shaped to discharge a thin stream of the air and waste material in a direction substantially tangential to the inner surface of the combustion chamber adjacent the inlet nozzle, an elongated gas collector tube mounted coaxially within and extending substantially the full length of the combustion chamber, said collector tube having one end extending outwardly therefrom through an opening in one of said end walls and terminating in an open outlet, the portion of said collector tube within said combustion chamber being substantially frusto-conical and having its larger end extending through said opening in said one wall, a plurality of openings formed in said collector tube and spaced along substantially its full length within the combustion chamber to permit gases to flow into the collector tube from the combustion chamber and out said outlet, and auxiliary burner nozzle means for heating the combustion chamber to ignite combustible material entering the combustion chamber through said inlet nozzle.

10. The invention as defined in claim 9 wherein said collector tube has its other end located within the combustion chamber, said other end being closed to preclude the entry of combustion gases therethrough.

11. The invention as defined in claim 10 wherein said collector tube is formed from a high-temperature metal alloy capable of withstanding the high temperatures encountered within the incinerator.

12. The invention as defined in claim 11 wherein said plurality of openings in said collector tube are arranged to provide a substantially constant opening area along the length of the combustion chamber.

13. The invention as defined in claim 12 wherein said open outlet on said collector tube is spaced outwardly from said one wall a distance at least equal to the diameter of the collector tube at said outlet.

14. The invention as defined in claim 13 wherein said plurality of openings in said collector tube are arranged to provide a substantially constant opening area along the length of the combustion chamber.

15. A method of generating and supplying hot gas for use in heating and drying processes, comprising the steps of conveying combustible waste material in a stream of combustion air into a substantially cylindrical combustion chamber having closed end walls, discharging the combustible material and combustion air into the combustion chamber in a thin stream along substantially the full length of the combustion chamber and directed substantially tangential to the inner cylindrical surface of the combustion chamber, igniting the combustion material as it enters the combustion chamber, collecting the combustion gases in an axially extending collector tube mounted within the combustion chamber and having an open end extending through an opening in one end wall of the combustion chamber, the collector tube within the combustion chamber being substantially frusto-conical and having its larger end extending through the opening in the one end wall, the collector tube having its other end closed and having a plurality of openings in its side walls along substantially its full length within the combustion chamber to permit the combustion gases to enter and flow out the open end, the frusto-conical shape of the collector tube facilitating the escape of gases from the combustion chamber along substantially its full length, providing a flow of cooling air over the exterior of the combustion chamber to absorb heat therefrom, and conducting the cooling air away from the combustion chamber through a duct system including a venturi-like section surrounding the open end of the collector tube whereby the hot combustion gases and the cooling air are mixed together after the cooling air passes over the combustion chamber, the mixed combustion gases and cooling air constituting the hot gas for use in heating and drying processes.

16. The method as defined in claim 15 wherein the combustible waste material and combustion air are discharged into the combustion chamber at a velocity and in a direction to produce an inwardly spiraling flow pattern to the collector tube, the openings in the collector tube being arranged around the complete periphery of the tube to provide a substantially uniform opening area along substantially the full length of the combustion chamber to permit the combustion gases to enter the collector tube at a substantially uniform rate along its full length.

* * * * *